US007755672B2

(12) United States Patent
Pertsel

(10) Patent No.: US 7,755,672 B2
(45) Date of Patent: Jul. 13, 2010

(54) TECHNIQUES FOR MODIFYING IMAGE FIELD DATA OBTAINED USING ILLUMINATION SOURCES

(75) Inventor: Shimon Pertsel, Sunnyvale, CA (US)

(73) Assignee: Zoran Corporation, Sunnyvale, CA (US)

( * ) Notice: Subject to any disclaimer, the term of this patent is extended or adjusted under 35 U.S.C. 154(b) by 1094 days.

(21) Appl. No.: 11/383,417

(22) Filed: May 15, 2006

(65) Prior Publication Data
US 2007/0262236 A1 Nov. 15, 2007

(51) Int. Cl.
*H04N 9/73* (2006.01)
*H04N 5/235* (2006.01)
*H04N 5/222* (2006.01)
*G06K 9/40* (2006.01)

(52) U.S. Cl. .................. 348/224.1; 348/222.1; 348/370; 382/274

(58) Field of Classification Search ........................ None
See application file for complete search history.

(56) References Cited

U.S. PATENT DOCUMENTS

| | | | | |
|---|---|---|---|---|
| 5,529,069 A | * | 6/1996 | Andoh | 600/410 |
| 7,583,297 B2 | * | 9/2009 | Yamada | 348/224.1 |
| 2002/0159049 A1 | * | 10/2002 | Sato et al. | 356/121 |
| 2003/0044066 A1 | * | 3/2003 | Sakaguchi | 382/168 |
| 2003/0184671 A1 | * | 10/2003 | Robins et al. | 348/362 |
| 2004/0041919 A1 | * | 3/2004 | Yamanaka | 348/222.1 |
| 2004/0145674 A1 | * | 7/2004 | Hoppe et al. | 348/371 |
| 2004/0179108 A1 | | 9/2004 | Sorek et al. | |
| 2005/0243175 A1 | * | 11/2005 | Yamada et al. | 348/207.1 |
| 2006/0017837 A1 | | 1/2006 | Sorek et al. | |
| 2006/0119710 A1 | * | 6/2006 | Ben-Ezra et al. | 348/208.99 |

FOREIGN PATENT DOCUMENTS

JP 2003-304443 A 10/2003

OTHER PUBLICATIONS

Petschnigg et al., "Digital Photography with Flash and No-Flash Image Pairs," Microsoft Corporation, Aug. 2004, 9 pages.
EPO/ISA, "Notification of Transmittal of the International Search Report and the Written Opinion of the International Searching Authority, or the Declaration," corresponding International Patent Application No. PCT/US2007/067229, mailed on Sep. 11, 2007, 21 pages.

* cited by examiner

*Primary Examiner*—Lin Ye
*Assistant Examiner*—Euel K Cowan
(74) *Attorney, Agent, or Firm*—Dickstein Shapiro LLP

(57) ABSTRACT

Techniques for modifying data of an image that can be implemented in a digital camera, video image capturing device and other optical systems are provided to correct for non-uniform illumination and/or effects of saturation appearing in data obtained using one or more artificial illumination sources. In an implementation, correction factors are derived using data from at least two images that have been captured with different illumination levels of the object scene and close in time to the capture of the image of interest. Typically, the image of interest is of higher resolution than at least one of the at least two images.

32 Claims, 5 Drawing Sheets

TECHNIQUES FOR MODIFYING IMAGE FIELD DATA OBTAINED USING ILLUMINATION SOURCES

CROSS-REFERENCE TO RELATED APPLICATION

This is related to another application of Shimon Pertsel entitled "Compensating For Non-Uniform Illumination Of Object Fields Captured By A Camera," being filed concurrently herewith.

FIELD OF THE INVENTION

This invention relates generally to techniques of processing captured digital imaging data obtained using one or more illumination sources, and, more specifically, to processing binary digital image data obtained using one or more illumination sources to correct for variations across an imaged optical field such as, for example, to compensate for non-uniform illumination.

BACKGROUND

Digital cameras image scenes onto a two-dimensional sensor such as a charge-coupled-device (CCD), a complementary metal-on-silicon (CMOS) device or other type of light sensor. These devices include a large number of photo-detectors (typically three, four, five or more million) arranged across a small two dimensional surface that individually generate a signal proportional to the intensity of light or other optical radiation (including infrared and ultra-violet regions of the spectrum adjacent the visible light wavelengths) striking the element. These elements, forming pixels of an image, are typically scanned in a raster pattern to generate a serial stream of data of the intensity of radiation striking one sensor element after another as they are scanned. Color data are most commonly obtained by using photo-detectors that are sensitive to each of distinct color components (such as red, green and blue), alternately distributed across the sensor. Non-uniform illumination, and potentially other factors, causes an uneven distribution of light across the photo-sensor, and thus video signals from the sensor include data of the undesired intensity variation superimposed thereon.

SUMMARY OF THE INVENTION

One or more illumination sources may be used to illuminate an image field. An illumination source may, as an example, be a flash illumination device. An illumination source will often be part of the imaging device but may also be a separate device. An illumination source may produce non-uniform illumination across an image field. Non-uniform illumination may be attributed to imperfections in or other characteristics of an illumination source, improper alignment of an illumination source in relation to the x-y position of the image plane of the photo-sensor employed, and possibly other factors that may be present in a particular system.

The invention offers techniques for modifying image field data to compensate for non-uniformities in the illumination so as to minimize degradation of the final adjusted image by these non-uniformities in one or more illumination sources. The amount of compensation applied to the signal from each photo-detector element is dependent upon the position of the element in relationship to the pattern of non-uniform illumination of the image field across the surface of the image photo-sensor.

Such non-uniform illumination compensation techniques have application to digital cameras and other types of digital image capturing devices employing one or more illumination sources but are not limited to such optical photo system applications. The techniques may be implemented at a low cost, require a minimum amount of memory, and operate at the same rate as the digital image data being modified is obtained from the photo-sensor, thereby not adversely affecting the performance of the digital image processing path. This is accomplished by applying correction factors in real time to the output signals of the photo-sensor in order to compensate for an undesired intensity variation across the photo-sensor.

In order to correct data of an image, a multi-image technique is utilized in which at least two images of the same object scene are captured using different illumination levels, and then processed to derive correction data. One or more of these images may be of a lower resolution than that of the final acquired image, thereby allowing the correction data to be calculated from a reduced amount of image data and then efficiently applied to correct data of the final image of interest as part of the image capture process. According to one aspect of the present invention, data for correcting for uneven illumination across an object scene are obtained from data of these at least two images.

According to another aspect of the present invention, details of areas of an image of interest that are lost due to positive (too much intensity) and/or negative (too little intensity) saturation of the photodetector are supplied from data of an image of the same object scene taken at one or more different levels of illumination. This technique compensates for a limited dynamic range of the photodetector. Data from one or more lower resolution images taken with a different illumination level than the final image can be used to recover detailed intensity data in portions of the higher resolution final image that are positively and/or negatively saturated. Data in a portion of a final image of interest lost due to negative saturation may be recovered from data in that portion of another image taken with higher illumination intensity, and data lost in positively saturated regions may be obtained from a lower intensity image of the same object scene.

Although only the uneven illumination or the saturation effect correction may be provided in a given camera or other image acquisition device without the other, both may alternatively be included in common image processing. In order to deal with effects of both positive and negative saturation, data of two additional images are acquired, one illuminated with a higher intensity than the image of interest and the other with a lower intensity. Both of these other images may be acquired with a lower resolution than the final image. Correction for uneven illumination then also utilizes data of one or both of the additional images.

As part of implementing correction for uneven illumination, a reduced amount of data of the undesired non-uniform illumination pattern (or the inverse, the non-uniform illumination correction factors) may be stored in one or more sparse two-dimensional lookup tables. A separate lookup table can be used for each color.

Additional objects, advantages and features of the present invention are included in the following description of exemplary embodiments thereof, which description should be taken in conjunction with the accompanying drawings. Each

DESCRIPTION OF EXEMPLARY EMBODIMENTS

Figure 1:
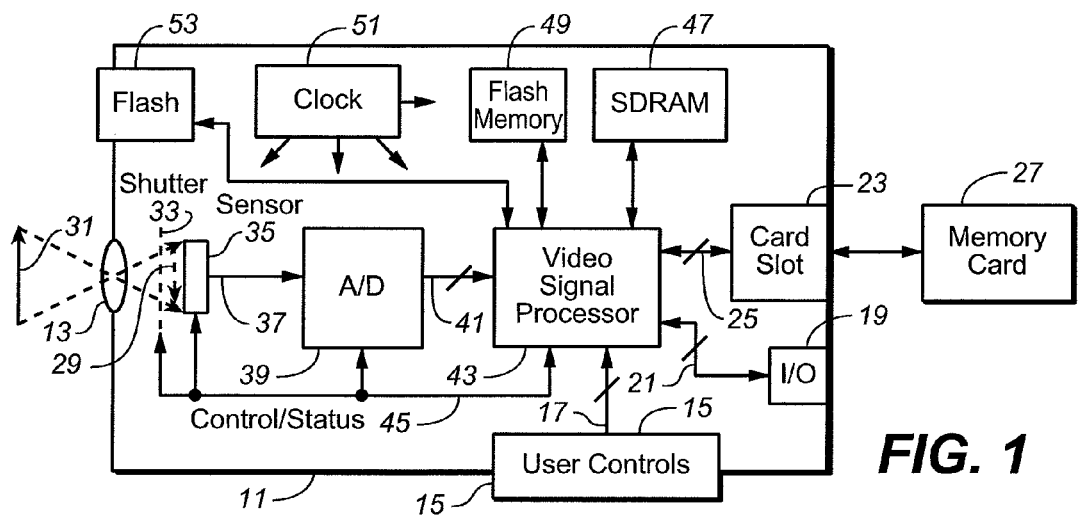
FIG. 1 schematically illustrates an digital camera in which the techniques of the present invention may be utilized.

When one or more illumination sources are used to illuminate an image field, non-uniform illumination across the image field may result in a variation of energy across each pixel of that light pattern. These energy variations are not related to the captured image or other picture data itself. The variation of illumination across the scene, assuming the objects in the scene are approximately the same distance from the source of the flash illumination, has fixed properties. These properties are directly related to the physical, optical and electronic characteristics of the illuminating flash source. In order to compensate for this variation in energy across the photo-sensor, each pixel value could be combined, such as by multiplication, with a non-uniform illumination correction factor. This factor is unique to each pixel in the image sensor according to the pixel's geographic location in the image sensor matrix. In the ideal case, a table of factors could be created during a calibration procedure that stores the required compensation factor for each pixel of the image in memory. This would allow the needed non-uniform illumination compensation to be effected by executing one of the following equations with a processing unit in the image capturing device:

$$PixelOut = PixelIn + F(X, Y) \quad (1a)$$

or $$PixelOut = PixelIn * F'(X, Y) \quad (1b)$$

where,

PixelOut=The intensity output of the non-uniform illumination compensation module; in other words, the corrected pixel;

PixelIn=The intensity input to the non-uniform illumination compensation module; in other words, the pixel before correction;

F(X,Y)=An additive correction factor, having units of intensity, which depends on the pixel's position expressed in terms of X and Y rectangular coordinates; and F'(X,Y)=A dimensionless multiplicative correction factor, which also depends on the pixel's position expressed in terms of X and Y rectangular coordinates.

To calculate the correction factors for the entire image, one of the following equations is executed:

$$CT[x,y] = T[x,y] + IC[x,y], \quad (2a)$$

or $$CT[x,y] = T[x,y] * IC'[x,y], \quad (2b)$$

where CT[x,y] is the illumination-corrected image data set of interest as a function of the position (x,y) of an image data point of interest, T[x,y] is the uncorrected image data set of interest as a function of the position (x,y) of an image data point of interest, and IC[x,y] is an additive illumination correction factor of equation (2a) as a function of the position (x,y) of a image data point of interest. IC'[x,y] is a dimensionless multiplicative illumination correction factor as a function of the position (x,y) of a image data point of interest, in the alternative equation (2b). Generally speaking, equations (2a) and (2b) represent the image-wide equivalent of equations (1a) and (1b), respectively, which are applied on a pixel by pixel (or pixel block by pixel block) basis. When all of the corrective factors IC[x,y] or IC'[x,y] for a particular image, depending upon which of equations (2a) or (2b) is being used, are listed according to their x,y coordinates, this list represents a two-dimensional mask. The values of that mask at positions x,y across the image are then combined with the image data at the same positions x,y across the image.

It would be very costly to implement the process defined by this equation on an integrated circuit with the storage of correction factors for each pixel of the photo-sensor. A large memory would be required to store a correction factor for each pixel and thus utilize a large area of silicon for the memory. Multiplication of the pixel values by the individual stored correction factors can further require a significant amount of silicon area for dedicated circuits to carry out the multiplication and/or can slow down the speed with which corrected data are obtained. Therefore, the techniques described herein provide alternative methods that require very little memory and processing power but yet eliminate undesired light patterns from the image that are caused by artificially illuminating the image scene.

Optical Device Example

An implementation of the techniques of the present invention is described in a digital camera or other digital image acquisition device, where digital data of the image(s) or other captured light pattern(s) obtained using one or more illumination sources are modified on the fly to compensate for intensity variations superimposed across the image due to non-uniform illumination. In FIG. 1, such a digital camera is schematically shown to include a case 11, an imaging optical system 13, user controls 15 that generate control signals 17, a video input-output receptacle 19 with internal electrical connections 21, and a card slot 23, with internal electrical connections 25, into which a non-volatile memory card 27 is removably inserted. Data of images captured by the camera may be stored on the memory card 27 or on an internal non-volatile memory (not shown). Image data may also be outputted to a video device, such as a television monitor, through the receptacle 19. The memory card 27 can be a commercially available semiconductor flash electrically erasable and programmable read-only-memory (EEPROM), small removable rotating magnetic disk or other non-volatile memory to which digital image data can be stored by the camera. Alternatively, particularly when the camera is taking motion image sequences at thirty image frames per second or the like, larger capacity storage media can be used instead, such as magnetic tape or a writable optical disk.

The optical system 13 can be a single lens, as shown, but will normally be a set of lenses. An image 29 of a scene 31 is formed as visible optical radiation through a shutter 33 onto a two-dimensional surface of an image sensor 35. An electrical output 37 of the sensor carries an analog signal resulting from scanning individual photo-detectors of the surface of the sensor 35 onto which the image 29 is projected. The sensor 35 typically contains a large number of individual photo-detectors arranged in a two-dimensional array of rows and columns to detect individual pixels of the image 29. Signals proportional to the intensity of light striking the individual photo-detectors are obtained in the output 37 in time sequence, typically by scanning them in a raster pattern, where the rows of photo-detectors are scanned one at a time from left to right, beginning at the top row, to generate a frame of digital image data from which the image 29 may be reconstructed. The analog signal 37 is applied to an analog-to-digital converter circuit chip 39 that generates digital data in circuits 41 of the image 29. Typically, the signal in circuits 41 is a sequence of individual blocks of digital data representing the intensity of light striking the individual photo-detectors of the sensor 35.

Processing of the video data in circuits 41 and control of the camera operation are provided, in this embodiment, by a single integrated circuit chip 43. In addition to being connected with the circuits 17, 21, 25 and 41, the circuit chip 43 is connected to control and status lines 45. The lines 45 are, in turn, connected with the shutter 33, sensor 29, analog-to-digital converter 39 and other components of the camera to provide synchronous operation of them. A separate volatile random-access memory circuit chip 47 is also connected to the processor chip 43 for temporary data storage. Also, a separate non-volatile re-programmable memory chip 49 is connected to the processor chip 43 for storage of the processor program, calibration data and the like. A usual clock circuit 51 is provided within the camera for providing clock signals to the circuit chips and other components. Rather than a separate component, the clock circuit for the system may alternatively be included on the processor chip 43. An illumination source 53 is connected to, and operates in response to instructions from, the processor chip 43.

Sensor 35 may have its large number of pixels logically divided into rectangles of a grid pattern. One way to determine the correction factor for individual pixels, without having to store such factors for all pixels of the array, is to store them for a representative few of the pixels in each block and then calculate the correction for other individual pixels by interpolation, linear or otherwise. That is, the size of the blocks of the grid pattern are made small enough such that the intensity variation of the non-uniform illumination pattern across an individual block may be predicted from a few stored values in the block. For each pixel location, the correction factor is extrapolated from this stored subset. The correction factor extrapolation formula is implemented as a two dimensional extrapolation responsive to the geometric distance between the pixel of interest at a current location, and neighboring pixels that are represented by a non-uniform illumination correction factor stored in a limited table of correction factors.

Figure 2:
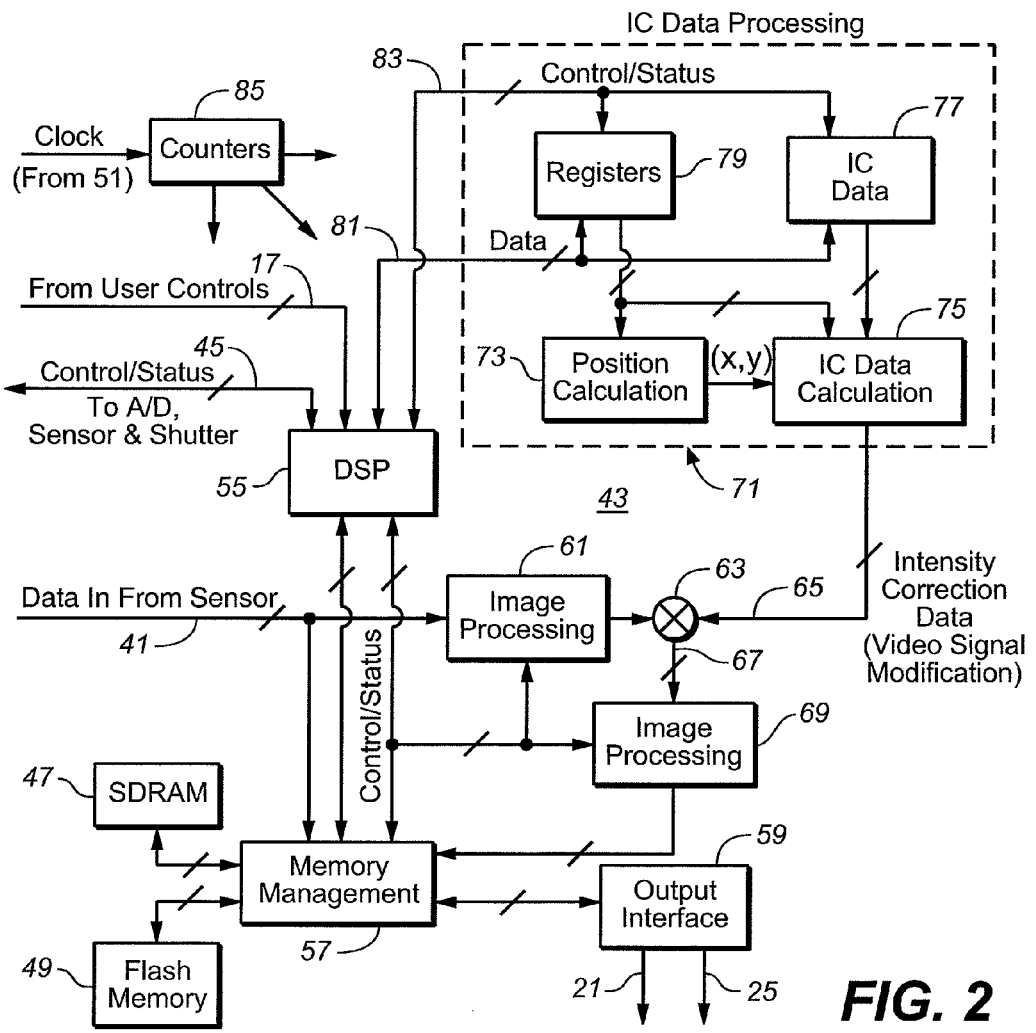
FIG. 2 is a block diagram of a portion of the electronic processing system of the device of FIG. 1.

A functional block diagram of the processor chip 43 is shown in FIG. 2. A digital signal processor (DSP) 55 is a key component, controlling both the operation of the chip 43 and other components of the camera. But since the DSP 55 does not extensively process video data, as discussed below, it may be a relatively simple and inexpensive processor. A memory management unit 57 interfaces the DSP 55 to the external memory chips 47 and 49, and to output interface circuits 59 that are connected to the input-output connector 19 and to the card slot 23 (FIG. 1) through respective circuits 21 and 25. The memory 47 is typically used for many things, such as temporary storage of data of images and image correction data that are calculated from data of images in ways described hereinafter.

The flow of digital image data through the block diagram of FIG. 2 from the analog-to-digital converter 39 (FIG. 1) is now generally described. The input data in lines 41 is pre-processed in a block 61 and then provided as one input to a multiplier circuit 63. Another input 65 to the multiplier 63 carries data that modifies the incoming video data, the modified video data appearing at an output 67 of the multiplier 63. In this example, the intensity correction data in lines 65 correct for the effects of lens shading and intensity variations imparted across the image by camera elements. After further image processing 69, as appropriate, the digital image data are directed through the memory management unit 57 to the output interface circuits 59 and then through either lines 21 to the input-output receptacle 19 or through lines 25 to the memory card slot 23 (FIG. 1), or both, of the camera for display and/or storage.

The intensity correction data in lines 65 are generated by a block of dedicated processing circuits 71. The block 71 includes circuits 73 that provide the (X, Y) position of each image pixel from which video data are currently being acquired. This pixel position is then used by an intensity correction data calculation circuit 75 to generate the modification factor applied to the multiplier 63. A memory 77 stores a look-up table. In order to reduce the size of the memory 77, only a small amount of correction data are stored in the look-up table and the circuits 75 calculate the correction values of individual pixels from such data.

A set of registers 79 stores parameters and intermediate results that are used by both of the calculation circuits 73 and 75. The calculation circuits 73 and 75 operate independently of the DSP 55. The DSP could possibly be used to make these calculations instead but this would require an extremely fast processor, if sufficient speed were even available, would be expensive and would take considerable more space on the chip 43. The circuits 73 and 75, dedicated to performing the required repetitive calculations without participation by the DSP 55, are quite straightforward in structure, take little space on the chip 43 and frees up the DSP 55 to perform other functions. The memory or memories 77 and 79 storing the image modification data and parameters are preferably a volatile random-access type for access speed and process compatibility with other processor circuits so that they can all be included on a single cost effective chip.

A typical digital imaging system processes data for each of multiple distinct color components of the image. A typical commercial sensor alternates photo-detectors along the rows that are covered with red, green and blue filters. There are several different arrangements of the color sensitive photo-detectors that are commercially used. In one such arrangement, one row contains alternating red and green sensitive photo-detectors, while the next row contains alternating blue and green sensitive photo-detectors, the photo-detectors also being positioned along the rows to provide alternating color sensitivity in columns. Other standard arrangements use other combinations of the alternating colors.

If there is only one set of correction data for all of the discrete colors being detected, an image modification factor is generated for each image pixel from that set of data, regardless of the color. This is quite adequate in cases where the variation across the image that is being removed by the signal modification affects all colors to the same or nearly the same degree. However, where the variation is significantly color dependent, separate correction factors are preferably used for each color component.

One desirable flash strobe module is an insulated gate bipolar transistor (IGBT), allowing for the intensity of the illumination level to be controlled. A flash strobe module employing a silicon-controlled rectifier (SCR) does not permit effective control of flash intensity.

Specific Embodiments

Non-uniform illumination correction factors are derived using data from at least two images that have been captured using different illumination levels. The technique is preferably carried out by use of any two of the following: (1) an image illuminated by natural lighting, captured with no flash, (2) an image captured with a flash of reduced intensity ("semi-flash"), and (3) an image captured with full intensity flash illumination. Semi-flash or no-flash images may be preview images. Preview images are commonly captured by a camera or other imaging device at lower resolution than the final image and displayed to a user on a small display screen built into the camera as an indication of what the final image will look like.

Correction factors are derived that are applicable to the image of interest being captured, which is either one of the at least two images from which the correction factors are derived, or is captured close in time to when the at least two images are captured. These images of a common object scene will typically be captured within one second, and more commonly within one-half second or less. In either case, each of the at least two images capture an image that is very similar to the image of interest, and thus the correction factors derived from the at least two images are applicable to the image of interest. Typically, although not necessarily, the image of interest is of higher resolution than at least one of the at least two images from which the correction factors are derived. Data of the image of interest will usually be captured with use of a flash intensity illumination that is lower than the maximum possible flash intensity, and then corrected by the derived correction factors for an uneven distribution of the flash illumination.

In addition to correcting for uneven illumination, data from one or more images can be used to recover data from pixels or pixel blocks in the image of interest that would otherwise be unavailable due to saturation. Saturation can be either positive saturation (the pixel intensity is higher at a certain pixel or pixel block than can be handled by the photo-sensors) or negative saturation (the pixel intensity is lower at a certain pixel or pixel block than the photo-sensors can detect or is obscured by sensor noise). Typically, though not necessarily, the images from which the saturated data are recovered are of lower resolution than the image of interest, such as data of preview images. Details of an area of the image of interest that are lost due to positive saturation may be supplied from another image of the same object scene taken with a lower level of illumination. Conversely, image loss due to negative saturation may be corrected from data of an image taken at a higher illumination level. Therefore, if both positive and negative saturation are to be corrected, as well as uneven illumination of the object scene in the same process, image data of the object scene are obtained at both higher and lower levels of illumination than the image of interest. Data of the image of interest are then corrected for any saturation and uneven illumination by use of data of the other two images captured of the same object scene. However, if negative saturation is not desired to be corrected, use of data from at least one image of no or partial artificial illumination is preferred to correct the image of interest which can then be captured at full artificial illumination.

Figure 3:
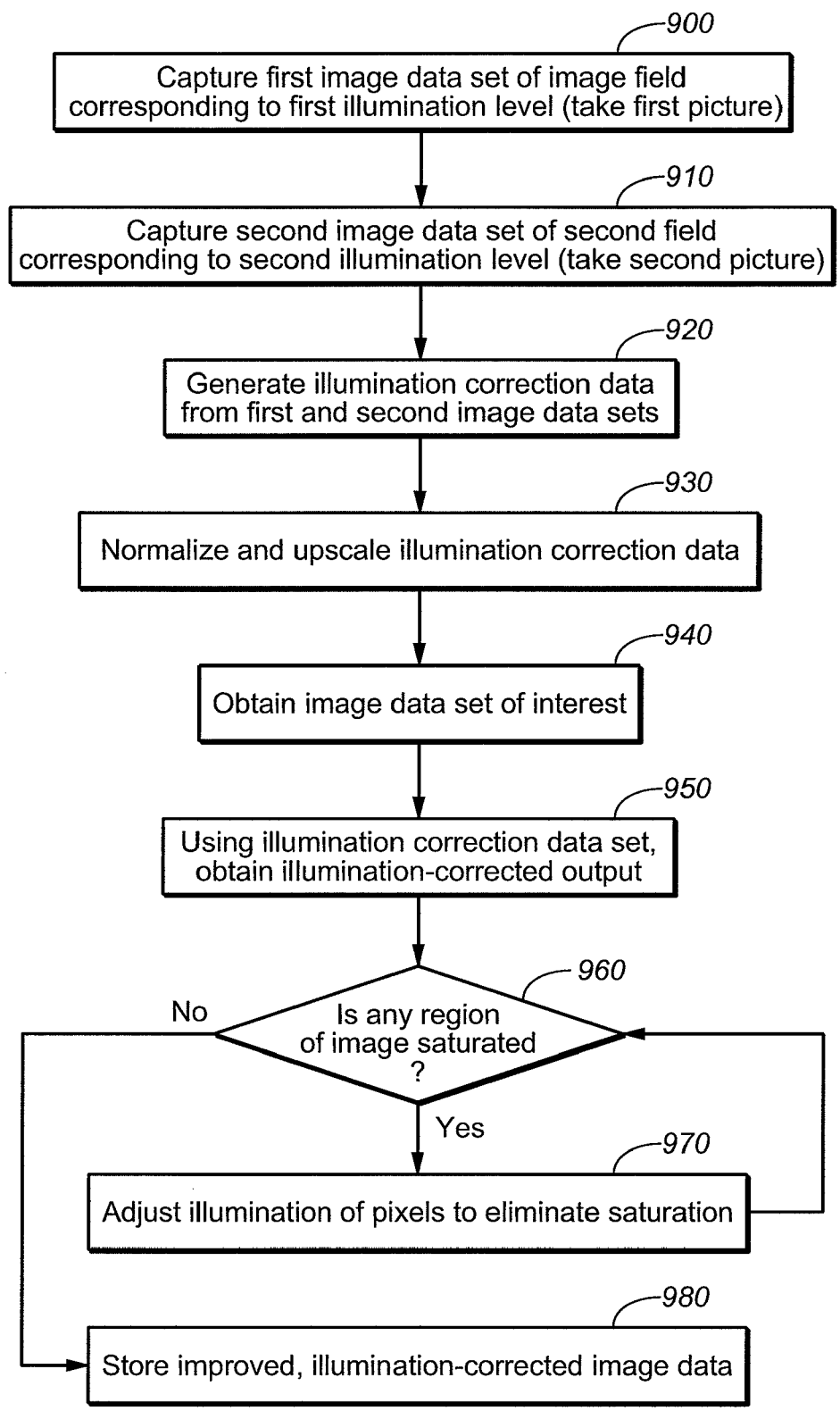
FIG. 3 is a block diagram setting forth steps in the an embodiment of the invention, according to which data from first and second image sets is applied to a data set of interest to obtain an illumination-corrected data set of interest.

FIG. 3 is a flow chart illustrating the operation of the invention according to a specific embodiment. This embodiment presents a very robust technique enabling use of one or more lower resolution images of an object scene to correct a higher resolution image of that scene. A common pixel grouping in the low resolution image results in a three to one ratio in each dimension, so that a high resolution to low resolution ratio in this case would be nine to one. This embodiment also includes a technique for optionally compensating for image saturation in a high resolution image, both positive saturation and negative saturation, using data from at least one lower resolution image. Saturated pixels are replaced with counterpart processed pixels from one or more lower resolution images captured with partial or no artificial flash light (for positive saturation) and with a higher level of artificial flash light than used to capture the image of interest (for negative saturation). Essentially lost information is recovered from the lower resolution images, information that is not otherwise available. The appearance of the picture is thereby significantly improved.

FIG. 3 sets forth steps in applying data from first and second image sets to a data set of interest to obtain an illumination-corrected data set of interest. In a step 900, a first image data set of the image field is captured at a first illumination level. This step can use no illumination (only natural lighting is present), partial illumination ("semi-flash," a portion of the full intensity of the artificial illumination used to capture the image of interest) or the full intensity if the effects of negative saturation of the image of interest are desired to be corrected. In a step 910, a second image data set of the image field may be captured at a different one of these three illumination levels. In a step 920, illumination correction data are generated from the first and second image data sets. Optionally, in step 930, the illumination correction data is normalized. In a step 940, the image data set of interest is obtained. The image data set of interest may be obtained through a capture of an image data set of the object scene illuminated at a third illumination level, or it may be obtained by designating one of the first two image data sets as the image data set of interest if captured with full intensity. The image data set of interest is, of course, captured with the full resolution. In a step 950, illumination-corrected output is generated using the illumination correction data set.

Optionally, in addition to correcting for non-uniform artificial illumination of an object scene, data lost because of the saturation of one or more areas of the camera photo-detector may be recovered. In a step 960, it is queried whether any region of the image is saturated. Regions of both positive and negative saturation may be noted, or only one of them. If the answer is yes, then in a step 970, data in the region(s) of the saturated pixels is adjusted by substituting data from the same region(s) of an image acquired with a different light level in order to eliminate the effects of saturation. The process then loops back to the step 960 to determine whether there are any further saturated regions. In the step 960, if the answer is no, then the process continues to a step 980. In the step 980, the improved, illumination and saturation corrected data of the full resolution image of interest is stored.

According to a specific implementation, the illumination correction data may be computed in the step 920 from a simple formula including the difference between the intensity of the same image pixel or pixel block at two different levels of artificial illumination. In the case where one image is captured at zero artificial illumination, the illumination correction is computed as the difference of the two intensities:

$$IC[x,y] = (a[x,y] - b[x,y]),  \quad (3)$$

where IC[x,y] is the illumination correction as a function of the position (x,y) of an image data point of interest, a[x,y] is the intensity as a function of the position (x,y) of the data point in the image data set captured at non-zero artificial illumination, and b[x,y] is the intensity as a function of the position (x,y) of the data point in the image data set captured at zero artificial illumination.

Where neither image is captured at zero artificial illumination (different levels of flash light are used to capture data of the two images, for example), the illumination correction data are computed according to the formula:

$$IC[x,y] = Y/X(a[x,y] - b[x,y]),  \quad (4)$$

where IC[x,y] is the illumination correction as a function of the position (x,y) of an image data point of interest captured at illumination level Y, b[x,y] is the intensity as a function of the position (x,y) of the data point in one of the two or more image data sets, captured at artificial illumination level X, that does not represent the final image data set of interest, a[x,y] is the intensity as a function of the position (x,y) of the data point in the image data set of interest captured at illumination level Y, and wherein Y is greater than X.

Use of one of the equations (3) or (4), depending upon the relative illumination used to acquire the two images, provides the correction data result of the step 920 of FIG. 3. The correction data IC[x,y] are preferably of lower resolution than the captured image data that are corrected by them. This makes it more convenient, and in some cases makes it possible, to do the correction processing as part of the final full resolution image capture process. With lower resolution images, less data must be processed. Low resolution correction data are used, after possible normalization and upscaling in the step 930, by combining the data on a pixel-block by pixel-block basis with the final captured image data, per the step 950. The correction data, in effect, define a two-dimensional mask that is blended with data of the final desired image to correct it for uneven artificial illumination of the object scene being photographed. And although the intensity correction values of equations (3) and (4) are added to the captured values of the final picture, the correction data can alternatively be presented in dimensionless ratios by which the final captured picture values are multiplied (compare with equations 1b and 2b and the explanation above).

Further, implementation of either of the equations (3) or (4) is preferably carried out with its terms a[x,y] and b[x,y] expressed with the same resolution. This means that when their resolutions are different, either the low resolution data is upscaled or the high resolution data is downscaled before combination. This upscaling or downscaling is also preferably performed prior to performing other mathematical manipulations of two or more sets of image data having different resolutions.

In the step 960 of FIG. 3, it is asked whether there is any region(s) of the corrected final image data that is saturated. Saturation occurs when the pixel intensity is either so high (positive saturation) or so low (negative saturation) that it lies outside the dynamic range of the photodector. In a specific embodiment, the intensity correction data are normalized in step 930, as part of correcting for positive and/or negative saturation of image data points. A histogram of pixels in the illumination correction data set is built so as to facilitate the IC data set normalization. Normalization is carried out according to an algorithm based on the histogram of pixel intensity, using at least one of an upper normalization threshold U and a lower normalization threshold L. Each normalization threshold U and/or L is obtained either through user selection or through retrieval from memory. Upper normalization threshold U and lower normalization threshold L are each numbers no less than zero and no greater than 100. Each normalization threshold represents the percentage of total pixels that are not corrected for saturation. For example, if U=80, then 80% of the pixels are not corrected for positive saturation. If L=90, then 90% of the pixels are not corrected for negative saturation.

Figure 4A:
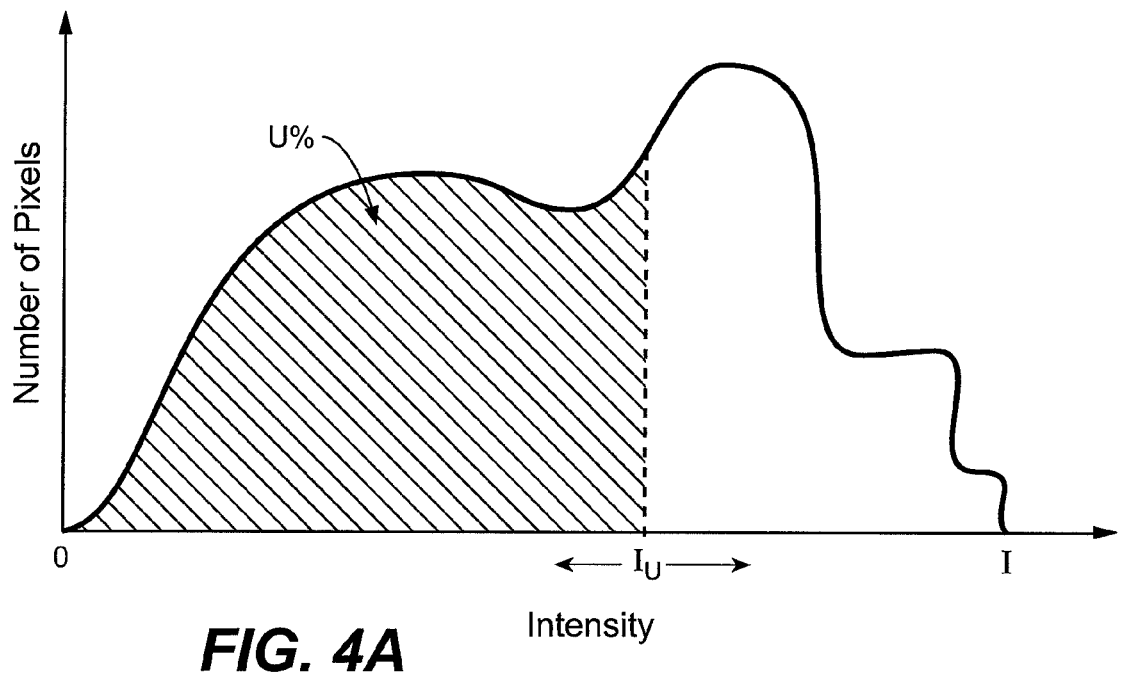
FIGS. 4A and 4B graphically illustrates the determination of upper and lower normalization threshold levels in a specific implementation.
Figure 4B:
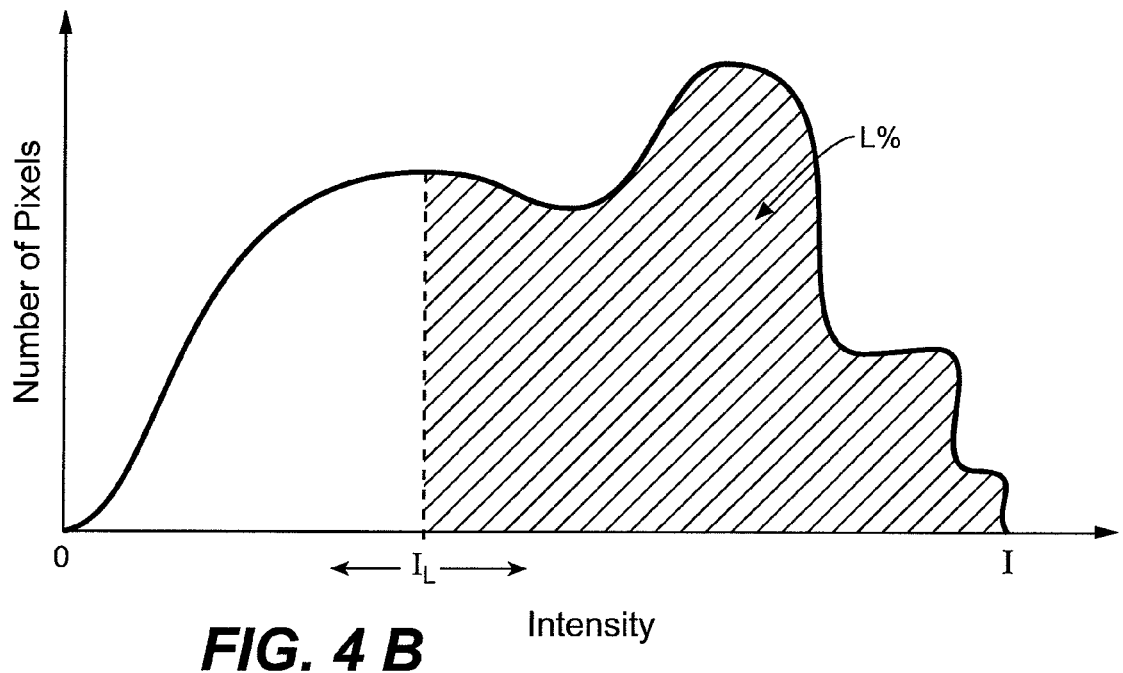

FIG. 4A graphically illustrates the determination, according to this specific embodiment, of an upper normalization level $I_U$, and FIG. 4B the determination of a lower normalization level $I_L$, at least one of which is used in obtaining a normalized illumination correction data set capable of use to correct for both positive and negative saturation.

In FIG. 4A, upper normalization threshold U equals the percentage of data points with intensity values less than upper normalization level $I_U$. Upper normalization level $I_U$ represents the pixel intensity value above which correction is performed for positive saturation. $I_U$ is found by adjusting the position of the dotted line until U % of the total data points have values less than $I_U$. The shaded area under the intensity curve bounded by $I_U$ is U % of the total area under the intensity curve. $I_U$ is essentially the pixel intensity value above which positive saturation is presumed and therefore positive saturation correction is performed. According to this embodiment, positive saturation correction is performed by setting the normalized intensity correction data point equal to the intensity correction data point multiplied by the ratio of $I_U$ to the intensity of the data point of interest for all pixel values greater than $I_U$, i.e., $$I_{normalized\text{-}ic} = I_{ic} * I_U / I_{data\text{-}point\text{-}of\text{-}interest} \quad (5)$$

and by setting the normalized intensity correction data point equal to the intensity correction data point for all pixel values less than or equal to $I_U$. Application of the normalized correction data according to equation (2b) then results in normalized intensity- and saturation-corrected data points equal to $I_U$ multiplied by the appropriate intensity correction data point for all pixel values greater than $I_U$, and the normalized data points will be equal to the non-normalized data points for all pixel values less than or equal to $I_U$. This process effectively substitutes the user or memory-selected upper normalization level $I_U$, modified by the corresponding intensity correction factor, for all intensity values greater than $I_U$. For intensity values less than or equal to $I_U$, the normalized data point is the same as the non-normalized data point.

In FIG. 4B, lower normalization threshold L equals the percentage of data points with intensity values greater than lower normalization level $I_L$. Lower normalization level $I_L$ represents the pixel intensity value below which correction is performed for negative saturation. $I_L$ is found by adjusting the position of the dotted line until L % of the total data points have values greater than $I_L$. The shaded area under the intensity curve bounded by $I_L$ is L % of the total area under the intensity curve. $I_L$ is essentially the pixel intensity value below which negative saturation is presumed and therefore negative saturation correction is performed. Negative saturation correction is performed by setting the normalized intensity correction data point equal to the intensity correction data point multiplied by the ratio of $I_L$ to the intensity of the data point of interest for all pixel values less than $I_L$, i.e., $$I_{normalized\text{-}ic} = I_{ic} * I_L / I_{data\text{-}point\text{-}of\text{-}interest} \quad (6)$$

and by setting the normalized intensity correction data point equal to the intensity correction data point for all pixel values greater than $I_L$. Application of the normalized correction data according to equation (2b) then results in normalized intensity and saturation corrected data points equal to $I_L$ multiplied by the appropriate intensity correction data point for all pixel values greater than $I_L$, and the normalized data points will be equal to the non-normalized data points for all pixel values less than or equal to $I_L$. This embodiment essentially presumes that in case of saturation, a useful approximation of the true intensity in the saturated regions can be obtained by setting the intensity in those regions to the value of the corresponding normalization level, either $I_U$ or $I_L$, multiplied by a factor which is responsive to image data that have been captured under higher or lower illumination conditions.

This algorithm is not well-defined at the singularity that occurs when during negative saturation correction, the intensity of the data point of interest is zero; in that event, the value of the corrected data point will always be zero regardless of the illumination correction factor, so any convenient illumination correction factor can be set for such points. This simplified algorithm, whether applied to positive or negative saturation or both, results in presumptively saturated data points being adjusted in the direction away from the saturation by the value of the appropriate normalization level $I_U$ or $I_L$. Presumptively non-saturated data points are not changed in value by this algorithm.

Figure 5:
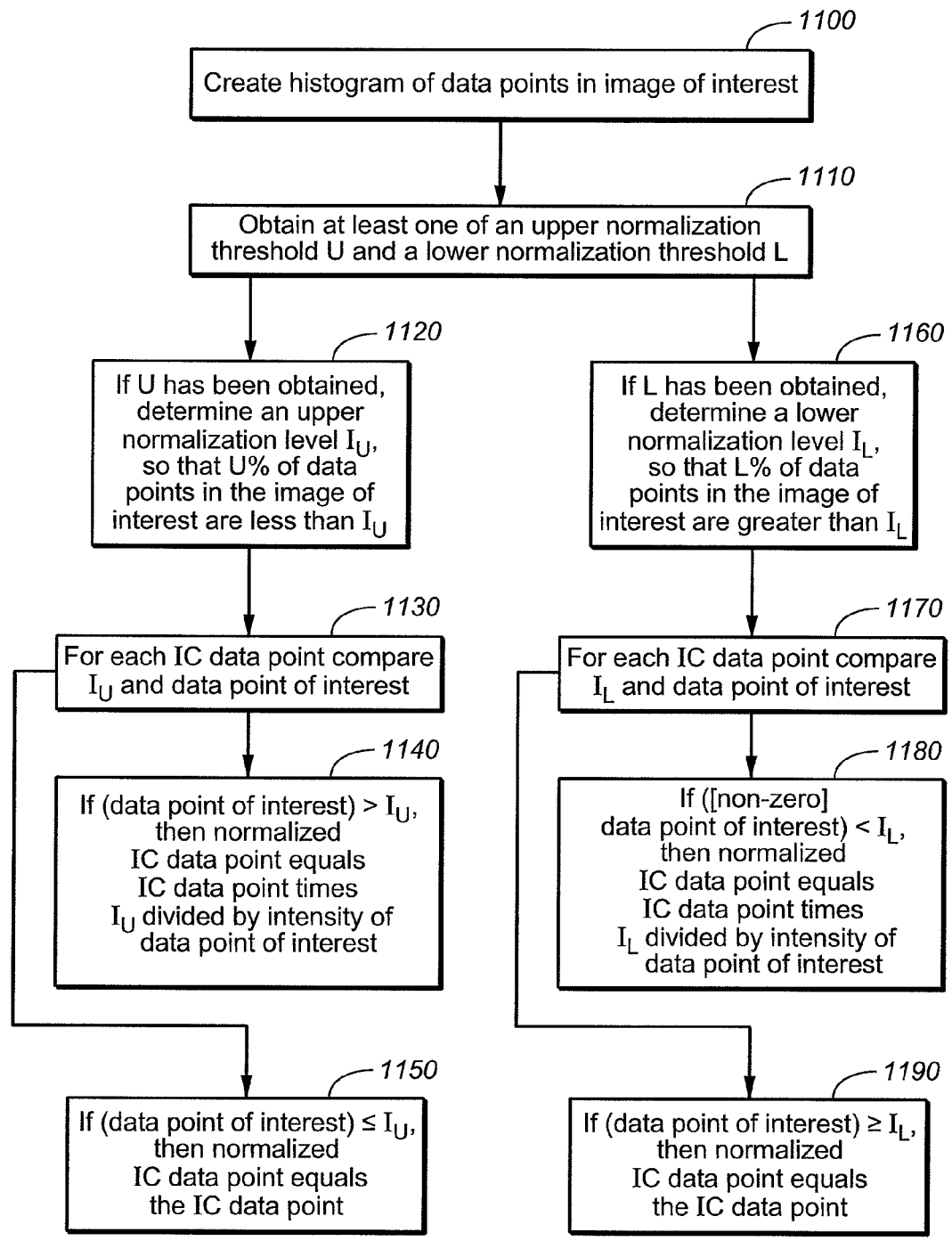
FIG. 5 is a block diagram setting forth steps, according to an embodiment of the invention, in obtaining a normalized illumination correction data set for use in obtaining an illumination-corrected data set of interest.

FIG. 5 is a flow chart setting forth steps, according to one specific embodiment, in obtaining a normalized illumination correction data set capable of saturation correction for use in obtaining an illumination-corrected data set of interest. A histogram of pixels in the correction mask is built so as to facilitate mask normalization. Normalization is carried out according to an algorithm based on the histogram and using at least one of an upper normalization threshold U and a lower normalization threshold L. Each normalization threshold can be either pre-set or user-selected.

In a step 1100 of FIG. 5, a histogram is created of data points in the image of interest. In a step 1110, at least one of an upper normalization threshold U and a lower normalization threshold L is obtained, either through user selection or through retrieval from memory. In a step 1120, if an upper normalization threshold U has been obtained, an upper normalization level $I_U$ is determined, such that U % of the data points in the image of interest are less than $I_U$. In a step 1130, for each illumination correction data point, the values of $I_U$ and the data point of interest obtained from the image of interest are compared. If the data point of interest is greater than $I_U$, then in a step 1140, the normalized IC data point is set equal to $I_U$ divided by the intensity of the data point of interest obtained from a preview image in which the data point of interest is not positively saturated, times the ratio of the magnitude of the illumination intensity employed to captured the image of interest to the illumination intensity employed to capture the preview image, where a preview image captured using ambient lighting is assumed to have an illumination intensity of 1 and a preview image captured using ambient lighting plus additional artificial lighting has an illumination intensity of 1 plus the intensity of the applied artificial lighting. In equation form this would read:

$$I_{normalized\text{-}ic} = I_{ic} * I_U / ((I_{data\text{-}point\text{-}of\text{-}interest}) * (\text{Illumination intensity}_{Image\ Of\ Interest} / \text{Illumination Intensity}_{Preview\ Image}) \quad (7)$$

Note that in this case the illumination intensity employed to to capture the image of interest will be greater than the illumination intensity employed to capture the preview image.

On the other hand, if in the step 1130, the data point of interest is less than or equal to IU, then in a step 1150, the normalized IC data point is set equal to one. In a step 1160, if a lower normalization threshold L has been obtained, a lower normalization level $I_L$ is determined, such that L % of the illumination correction data points are greater than $I_L$. In a step 1170, for each illumination correction data point, the values of $I_L$ and the data point of interest are compared. If the data point of interest is less than $I_L$, then in a step 1180, the normalized IC data point is set equal to $I_L$ divided by the intensity of the data point of interest obtained from a preview image in which the data point of interest is not negatively saturated, times the ratio of the magnitude of the illumination intensity employed to captured the Image of Interest to the illumination intensity employed to capture the preview image, where a preview image captured using ambient lighting is assumed to have an illumination intensity of 1 and a preview image captured using ambient lighting plus additional artificial lighting has an illumination intensity of 1 plus the intensity of the applied artificial lighting. In equation form this would read:

$$I_{normalized\text{-}ic} = I_{ic} * I_L / ((I_{data\text{-}point\text{-}of\text{-}interest}) * (\text{Illumination intensity}_{Image\ Of\ Interest} / \text{Illumination Intensity}_{Preview\ Image})) \quad (8)$$

Note that in this case the illumination intensity employed to capture the image of interest will be less than the illumination intensity employed to capture the preview image. On the other hand, if in the step 1160, the data point of interest is greater than or equal to IL, then in a step 1190, the normalized IC data point is set equal to one.

A typical dynamic range for photographic film is on the order of 10,000 to 1, while a typical dynamic range for a digital imaging device is typically less than 1,000 to 1. The present invention makes it possible to partition dynamic range by use of images captured at various illumination power levels. Compensation is thereby effected not only for non-uniform illumination but also for the limited dynamic range of the imaging system itself. Each image set of a particular object scene will ideally be captured at a different illumination level, to maximize the usefulness of the different image sets. The specific techniques of this embodiment include capturing one or more preview images at different flash intensities. That is, low resolution images are captured using different flash illumination intensities and high resolution images of the same object scene are captured with use of a known flash intensity. In regions of the fill resolution final image that are identified to be positively saturated by the above-described normalization process, for example, unsaturated image data from a low resolution partial or no flash light image are substituted after upscaling their resolution and adjusting of their intensity level to match those of the final image. Likewise, in regions of the full resolution final image that are identified to be negatively saturated by the above-described normalization process, for example, unsaturated image data from a low resolution maximum flash light image are substituted after upscaling their resolution and adjusting their intensity level to match those of the final image.

The acquired final image data may be corrected by the correction data obtained according to the appropriate one of equations (3) or (4) discussed above, according to the equation:

$$CT[x,y] = T[x,y] + (IC[x,y])ICR \qquad (9)$$

But if the correction data are instead formulated as a dimensionless ratio, by the equation:

$$CT[x,y] = T[x,y] * (IC'[x,y] \exp[ICR]), \qquad (10)$$

where CT[x,y] is the illumination-corrected image data set of interest as a function of the position (x,y) of an image data point of interest, T[x,y] is the final uncorrected data of the object scene of interest as a function of the position (x,y) of an image data point of interest, and IC[x,y] and IC'[x,y] are the illumination correction data as a function of the position (x,y) of a image data point of interest. IC[x,y] represents correction data that are added to the final image acquired data T[x,y], and IC[x,y] represents correction data multiplied with the final image acquired data T[x,y] to obtain the corrected image data CT[x,y]. ICR is an illumination correction ratio, a number typically no less than zero and no greater than one. Use of the ICR is optional but desirable to give the camera manufacturer or user the opportunity to adjust the effect of the illumination compensation. For equation (9), an ICR=1 gives full effect to the correction data IC[x,y], while ICR=0 eliminates the correction altogether. Similarly, in equation (10), if ICR equals 1, the correction data are given full effect and equation (10) reduces to the more general equation (2b). If the ICR of equation (10) equals zero, no illumination correction is performed. The ICR may be stored in a non-volatile memory of the camera by the manufacturer or user to control the degree to which the uneven illumination compensation is allowed to automatically take place.

Figure 6:
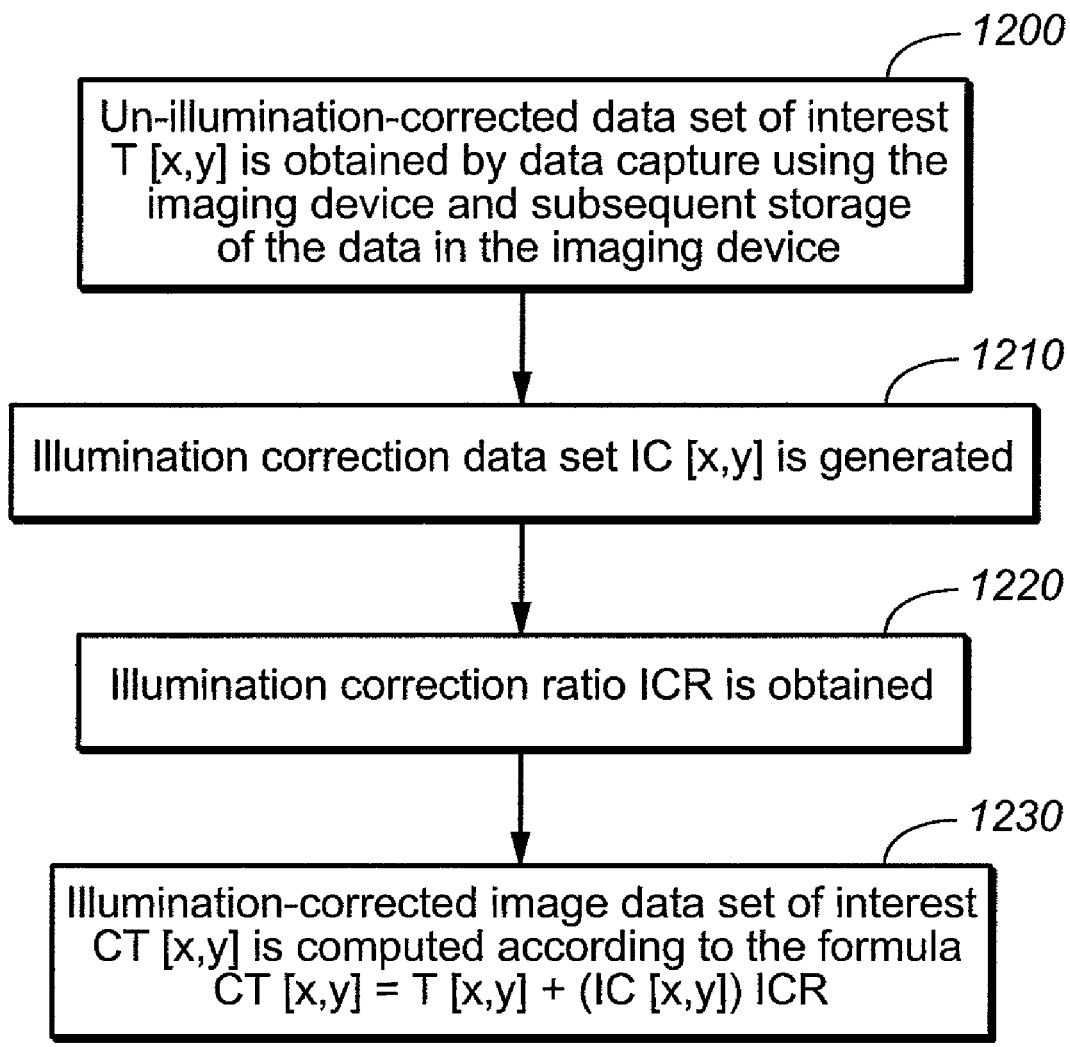
FIG. 6 is a block diagram setting forth steps in the computation of a set of illumination-corrected image data of interest CT[x,y].

FIG. 6 is a flow chart illustrating steps, according to this specific embodiment, of computing the illumination-corrected data set of interest for the final acquired image. In a step 1200, the un-illumination-corrected image data set of interest T[x,y] is obtained by data capture using the imaging device and subsequent storage of the data in the imaging device. In a step 1210, the illumination correction data set IC[x,y] is generated, for example, by application of equation (3) or equation (4). In a step 1220, the illumination correction ratio ICR is obtained, either through user selection or through retrieval from memory. In a step 1230, the illumination-corrected image data set of interest CT[x,y] is computed by use of equation (9).

CONCLUSION

The present invention provides unique, automatic, illumination compensation of digital images captured from a non-uniformly lit scene. A common instance where such compensation is beneficial is the capture of a scene illuminated by a digital camera's small, built-in, electronic flash unit.

Although the present invention has been described with respect to certain embodiments, it will be understood that the invention is entitled to protection within the full scope of the appended claims.

It is claimed:

1. A method of modifying data of an image of an object field being electronically captured, comprising:
    capturing two or more image data sets of the object field with different levels of artificial illumination;
    generating, from the captured image data sets, illumination correction data that corrects for the artificial illumination being non-uniform across the object field;
    acquiring an image data set of interest of the object field, where the resolution of the data set of interest is greater than the resolution of at least one of the other two or more image data sets; and
    applying the illumination correction data set to the image data set of interest to obtain an illumination-corrected image data set of interest, thereby compensating for variations in the intensity across the image field that are attributable to the artificial illumination of the object field, wherein the illumination correction data is based at least in part on a difference between intensity of an image data point of interest from one of the image data sets captured at a first artificial illumination level, and intensity of a corresponding image data point of interest from another of the image data sets captured at a second artificial illumination level, where such difference is further multiplied by a value resulting from dividing one of the first and second artificial illumination level by the other.

2. The method of claim 1, additionally comprising:
    revising the illumination correction data set according to said at least one of the other two or more image data sets in order to compensate for saturation of one or more portions of the image data set of interest, wherein said revising is carried out following generating illumination correction data and before applying the illumination correction data.

3. The method of claim 2, wherein revising the illumination correction data set includes normalizing the acquired image data set of interest to identify any portions of the image data set of interest that are saturated.

4. The method of claim 2, wherein acquiring the image data set of interest includes receiving at least one normalization threshold level selection from a user.

5. The method of claim 2, wherein acquiring the image data set of interest includes retrieving at least one stored normalization threshold selection.

6. The method of claim 3, wherein normalizing the acquired image data set of interest comprises:
    defining at least one of an upper normalization threshold level $I_U$ and a lower normalization threshold $I_L$, wherein $I_U$ and $I_L$ each are no less than zero and no greater than a set maximum number;
    if U has been obtained, determining an upper normalization level $I_U$, such that U % of data points in the image of interest are less than $I^U$; and
    if L has been obtained, determining a lower normalization level $I_L$, such that L % of data points in the image of interest are greater than $I_L$.

7. The method of claim 1, wherein the acquired image data set of interest is one of the captured two or more image data sets.

8. The method of claim 1, wherein the acquired image data set of interest is separate from the other two or more image data sets.

9. The method of claim 1, wherein one of the different levels of artificial illumination is zero.

10. The method of claim 9, wherein generating the illumination correction data includes making a calculation according to the formula:

$$IC[x,y](a[x,y]-b[x,y]),$$

where IC [x,y] is the illumination correction as a function of the position (x,y) of an image data point of interest, b[x,y] is the intensity as a function of the position (x,y) of the data point in the image data set captured with zero artificial illumination, and a[x,y] is the intensity as a function of the position (x,y) of the data point in the image data set captured at non-zero artificial illumination.

11. The method of claim 1, wherein none of the different levels of artificial illumination is zero.

12. The method of claim 11, wherein the image data set of interest is the image data set captured at a higher of the different illumination levels.

13. The method of claim 1, wherein generating the illumination correction data includes making a calculation according to the formula:

$$IC[x,y]=Y/X(a[x,y]-b[x,y]),$$

where IC [x,y] is the illumination correction as a function of the position (x,y) within the object field, b[x,y] is the intensity as a function of the position (x,y) of the image data point of interest in the image data set captured at illumination level X, where X is the first artificial illumination level, a[x,y] is the intensity as a function of the position (x,y) of the image data point in the image data set of interest captured at illumination level Y, where Y is the second artificial illumination level, and wherein Y is greater than X.

14. The method of claim 1, wherein the capturing, generating, and applying functions are all accomplished on a single integrated circuit chip.

15. The method of claim 1, wherein the capturing, generating, and applying functions are all performed by electronic circuits dedicated to carrying out these functions.

16. The method of claim 1, wherein a data point of the captured two or more image data sets is either one or more individual pixels or one or more groups of neighboring pixels.

17. A method of modifying an image field being electronically captured using artificial illumination, comprising:
 directing the capture of a first image data set of the image field corresponding to a first illumination level;
 directing the capture of a second image data set of the image field corresponding to a second illumination level different from the first illumination level;
 designating an image data set of interest of the image field, where the resolution of the data set of interest is greater than the resolution of at least one of the other two image data sets;
 calculating a relationship between the first and second illumination levels;
 generating an illumination correction data set from the first and second image data sets, wherein the illumination correction data is based at least in part on a difference between intensity of an image data point of interest from the first image data set captured at the first illumination level, and intensity of a corresponding image data point of interest from the second image data set captured at the second illumination level, where such difference is further multiplied by a value resulting from dividing one of the first and second illumination levels by the other; and
 applying the illumination correction data set and the illumination level relationship to the image data set of interest to obtain an illumination-corrected image data set of interest, thereby compensating for uneven distribution of light across the image field.

18. The method of claim 17, wherein designating an image data set of interest includes selecting an image data set of interest from the first image data set or the second image data set.

19. The method of claim 17, wherein designating an image data set of interest includes acquiring an image data set of interest other than the first or second captured image data sets.

20. A method of modifying an image field being electronically captured, comprising:
 capturing a first image data set of the image field corresponding to a first artificial illumination level;
 capturing a second image data set of the image field corresponding to a second artificial illumination level different from said first illumination level;
 generating, from the captured first and second image data sets, illumination correction data as a function of position to compensate for uneven distribution of light from the illumination source, wherein the illumination correction data is based at least in part on a difference between intensity of an image data point of interest from the first image data set captured at the first illumination level, and intensity of a corresponding image data point of interest from the second image data set captured at the second illumination level, where such difference is further multiplied by a value resulting from dividing one of the first and second illumination levels by the other;
 obtaining an image data set of interest of the image field, where the resolution of the data set of interest is greater than the resolution of the other one or more image data sets; and
 applying the illumination correction data set to the image data set of interest to obtain an illumination-corrected image data set of interest, thereby compensating for variations in the intensity across the artificial illumination.

21. The method of claim 20, wherein one of the first or second artificial illumination levels is zero.

22. The method of claim 20, wherein neither of the first nor second artificial illumination levels is zero.

23. A method of modifying an image field being electronically captured, comprising:
 capturing two or more image data sets of the image field;
 generating, from the captured image data sets, illumination correction data that corrects for (1) any variations of intensity of artificial illumination of the image field as a function of position across the image field, and (2) any areas of saturation of the image field, wherein the illumination correction data is based at least in part on a difference between intensity of an image data point of interest from one of the image data sets captured at a first artificial illumination level, and intensity of a corresponding image data point of interest from another of the image data sets captured at a second artificial illumination level, where such difference is further multiplied by a value resulting from dividing the second artificial illumination level by the first artificial illumination level;
 acquiring an image data set of interest of the image field; and
 applying the illumination correction data set to the image data set of interest to obtain a corrected image data set of interest.

24. A method of correcting a set of data of an image of interest obtained by use of a photosensor, comprising:
 capturing first and second sets of data of respective first and second images on the photosensor of an object scene illuminated with first and second levels of artificial illumination that are different from each other,
 acquiring the set of data of the image of interest with the photosensor when the object scene is illuminated with a third level of artificial illumination that is between and different from the first and second levels, and utilizing illumination correction data generated from the first and second sets of data to correct the set of data of the image of interest for any areas of negative or positive saturation of the photosensor by the image of interest, wherein the illumination correction data is based at least in part on a difference between intensity of an image data point of interest from the first set of data captured at the first level of artificial illumination, and intensity of a corresponding image data point of interest from the second set of data captured at the second level of artificial illumination, where such difference is further multiplied by a value resulting from dividing one of the first and second levels of artificial illumination by the other.

25. The method of claim 24, wherein the first and second sets of data are captured with an image resolution that is less than that with the set of data of the image of interest are acquired.

26. The method of claim 24, wherein the first level of artificial illumination is zero.

27. An integrated circuit chip containing circuits capable of receiving and processing data obtained from a two-dimensional optical image detector, comprising:

said circuits functioning to capture two or more image data sets of an image field as illuminated by an illumination source, and that acquires an image data set of interest of the image field, where the resolution of the data set of interest is greater than the resolution of at least one of the other two or more image data sets; and said circuits further functioning to generate, from the captured image data sets, illumination correction data that corrects for artificial illumination of the image field as a function of position across the image field, and that applies the illumination correction data to the image data set of interest to obtain an illumination-corrected image data set of interest, thereby compensating for variations in the intensity across the image field that are attributable to the artificial illumination, wherein the illumination correction data is based at least in part on a difference between intensity of an image data point of interest from a first set of data captured at a first level of artificial illumination, and intensity of a corresponding image data point of interest from a second set of data captured at a second level of artificial illumination, where such difference is further multiplied by a value resulting from dividing one of the first and second levels of artificial illumination by the other.

28. The integrated circuit chip of claim 27, said circuits further functioning to generate, from the captured image data sets, a set of data that corrects for at least one of negative or positive saturation of one or more regions of the image detector, and that applies the saturation correction data set to the image data set of interest to obtain a saturation corrected image data set of interest.

29. A digital camera, comprising within a single unit:

a photodetector system that captures data of an image cast thereon, an optical system capable of casting an image of an object scene onto the photodetector, a flash illumination device capable of illuminating the object scene with at least first and second levels of illumination, a controller that causes at least first and second sets of image data of the object scene to be captured with respective first and second levels of illumination, and a signal processor capable of:

determining, from the captured first and second sets of data, variations in intensity in an image cast on the photodetector system, calculating therefrom correction data that corrects for uneven intensity distribution across the illumination of the object scene by the flash illumination device, wherein the correction data is based at least in part on a difference between intensity of an image data point of interest from the first set of data captured at a first level of artificial illumination, and intensity of a corresponding image data point of interest from the second set of data captured at a second level of artificial illumination, where such difference is further multiplied by a value resulting from dividing one of the first and second levels of artificial illumination by the other, storing the correction data, and thereafter combining the stored correction data with data of at least one other image captured by the photodetector system in order to correct for variations in the intensity across said at least one other image that are attributable to the flash illumination, wherein said at least one other image is captured by the photodetector system with a resolution that is higher than the resolution of the first or second sets of data.

30. A digital camera, comprising within a single unit:

a photodetector system that captures data of an image cast thereon, an optical system capable of casting an image of an object scene onto the photodetector, a flash illumination device capable of illuminating the object scene with at least first, second and third levels of illumination, wherein the second level is greater than the first level and the third level is greater than the second level, a controller that causes at first, second and third sets of image data of the object scene to be captured with respective first, second and third levels of illumination, and a signal processor that operates to:

calculate, from the captured first and third sets of data, data that corrects for any negative or positive saturation of the photodetector system in the second set of data, at least temporarily store the saturation correction data, thereafter combine the stored saturation correction data with the second set of data in order to correct for effects of any negative or positive saturation therein, determine, from the captured first and third sets of data, variations in intensity in an image cast on the photodetector system, calculate therefrom intensity correction data that corrects for uneven intensity distribution across the illumination of the object scene by the flash illumination device, wherein the intensity correction data is based at least in part on a difference between intensity of an image data point of interest from a first set of data captured at a first level of artificial illumination, and intensity of a corresponding image data point of interest from a second set of data captured at a second level of artificial illumination, where such difference is further multiplied by a value resulting from dividing one of the first and second levels of artificial illumination by the other, at least temporarily store the intensity correction data, and thereafter combine the stored correction data with second set of data in order to correct for variations in the intensity across the image of the second set of data that are attributable to non-uniformity of the flash illumination.

31. The digital camera of claim 30, wherein the signal processor further operates to process the second set of data with a resolution that is higher than the resolution of the first and third sets of data.

32. The digital camera of claim 30, wherein the signal processor further operates to process the second set of data with a higher resolution than the first and third sets of data.

* * * * *